May 1, 1945. D. GORDON 2,374,991
DEVICE FOR AIDING NIGHT VISION
Filed March 29, 1943
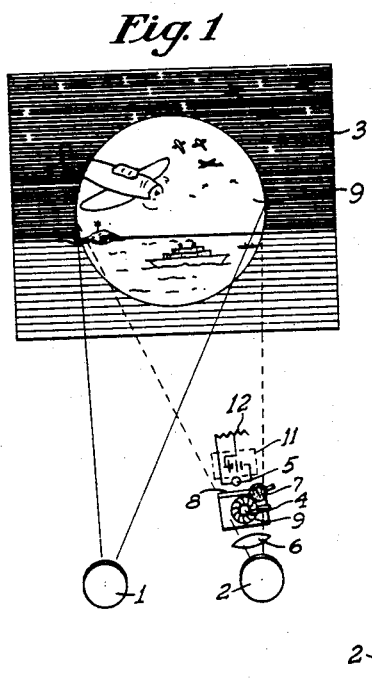
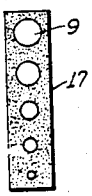
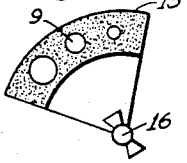
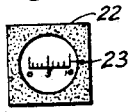
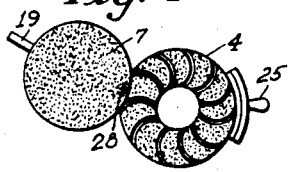
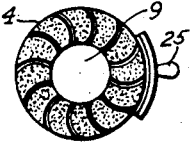
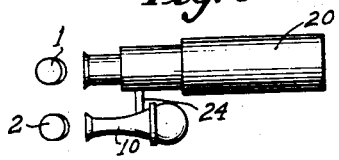
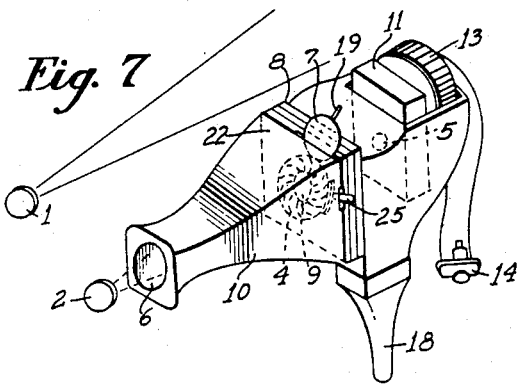
Inventor
DAVID GORDON
By [signature]
Attorney Patented May 1, 1945

2,374,991

UNITED STATES PATENT OFFICE 2,374,991

DEVICE FOR AIDING NIGHT VISION

David Gordon, Bridgeport, Conn.

Application March 29, 1943, Serial No. 480,925

1 Claim. (Cl. 88—1)

The present invention relates to a device for aiding night vision, and particularly an optical device for observing night or darkened scenes without the aid of a flashlight or other artificial source of illumination projected on such scenes. It is proposed to provide a device of this character adapted to be placed in front of one eye of the observer, to produce within its line of vision a spot of light controlled as to size and intensity, for the purpose of thereby increasing the perceptive ability of the other eye which views the scene directly.

A further object is to provide such a device which may be conveniently used either with the naked eye, or in conjunction with an auxiliary seeing aid, the latter being for instance, a telescope, a periscope, a gun sight, dark glasses, and the like, depending upon the particular circumstances and type of scene being viewed. The device will find use in marine, air, underwater, and land observation, as well as in darkened interiors. In addition to its night use it may find use in giving an increased brightness to the appearance of scenes in the day time, and also for aiding the vision of people having impaired eye-sight.

With the above and other objects in view, embodiments of the invention are shown in the accompanying drawing, and these embodiments will be hereinafter more fully described with reference thereto, and the invention will be finally pointed out in the claim.

In the drawing—

Fig. 1 is a diagrammatic view illustrating the general principle of the invention, and showing the relation of a night scene which is directly in the view of one eye, while the other eye has the device of the invention placed in its line of vision.

Fig. 2 is a plan view of a slide member for use in the device for varying the size of the light spot.

Fig. 3 is a plan view of a segment member for use in the device for varying the size of the light spot.

Fig. 4 is a plan view of an iris member for use in the device for varying the size of the light spot, and a shutter for use in the connection therewith.

Fig. 5 is a plan view of an iris member similar to that shown in Fig. 4, but without the shutter.

Fig. 6 is a perspective view showing one form of the device, and showing the eyes of the observer in relation thereto.

Fig. 7 is a perspective view of another form of the device, and showing the eyes of the observer in relation thereto.

Fig. 8 is a diagrammatic plan view, showing the use of the device in connection with a periscope.

Fig. 9 is a diagrammatic view plan view, showing the use of the device in connection with a telescope.

Fig. 10 is a diagrammatic plan view, showing the use of the device in connection with a gun sight.

Fig. 11 is a plan view of a measuring screen attachment for use within the device.

Fig. 12 is a diagrammatic plan view, showing the use of the device in connection with a pair of dark spectacles.

Fig. 13 is a perspective view, showing the manner in which the device is used for viewing a night scene.

Similar reference characters indicate corresponding parts throughout the several figures of the drawing.

Referring to the drawing, and in particular to Fig. 1 which illustrated the general principle of the invention, the left eye 1 of the observer is shown as directly viewing the night scene 3, while the right eye 2 of the observer has the device of the invention interposed in its line of vision. This device consists of a lens 6 which brings into focus an iris diaphragm 4, the opening 9 of which is increased or diminished by operation of a handle 25. The diaphragm 4 is suitably placed intermediate the ends of a casing 10, the lens 6 being provided at one end of the casing while the other end constitutes an opaque closure, within which a light bulb 5 is interposed in the line of vision through the opening 9. A ground glass 8 is provided between the aperture 9 and the light bulb 5 so that when the light bulb is lighted a diffused spot of light is seen through the opening 9, the size of this spot of light being controlled by varying the size of the opening. A screen 22 may be interposed between the aperture and the ground glass, and as shown in Fig. 11, may have measuring calibrations 23 provided thereon for the purpose of calculating distance in a manner similar to a range finder.

The light bulb 5 is energized by suitable batteries provided in a battery case 11, and may be controlled as to its intensity by a rheostat 12. It has been found that a suitable light bulb 5 is a 2.7 type bulb energized by two 3-volt batteries and controlled by a rheostat of 30 ohms resistance. As shown in Fig. 7, the rheostat may be provided with a knob 13, which may be turned to give the desired dimming and brightening of the spot of light as exposed through the aperture 9. By turning the knob quickly back and forth the spot of light may be given the effect of a series of light impulses. The circuit of the light bulb is opened and closed by means of a switch 14. The form of the device, as shown in Fig. 7, is provided with a handle 18 for conveniently holding it, as shown for instance in Fig. 13.

In Fig. 2 there is shown a slide member 17 having a series of apertures 9 of gradually increasing size, this member adapted to be used as an alternative for the iris diaphragm 4, for varying the size of the light spot.

In Fig. 3, there is shown a segment member 15 having a series of apertures 9 of gradually increasing size, and adapted to be rotated or swung by a handle 16, this member also adapted to be used as an alternative for varying the size of the light spot.

As shown in Fig. 4 and Fig. 7, an opaque shutter 7 may be incorporated in the device in a position to be moved into relation with the aperture 9 to open and close it, this movement being accomplished through a handle 19. This shutter 7 has a circular periphery 28, and in operation may be rotated or swung over the aperture 9 for the purpose of giving a series of flash effects, as well as for the purpose of cutting down the light of the aperture.

In Fig. 8 the device of the invention is shown in conjunction with a periscope 26, the device being interposed in the line of vision of the right eye 2, while the periscope is interposed in the line of vision with the left eye 1.

In Fig. 9 the device is shown as connected by a support 24 to a telescope 20, the device being in the line of vision of the right eye 2, while the telescope is interposed in the line of vision of the left eye 1.

In Fig. 10, the device is shown as used in connection with a gun 21 having the usual gun sights, the device being shown in the line of vision of the right eye 2, while the gun sights are shown in the line of vision of the left eye 1.

Fig. 12 shows the device in connection with a pair of dark glasses 27, its use in this manner being especially for observing objects against the glare of the sun, as for instance, airplanes in the sky during the day time. These glasses may, if desired, be of various colors for giving novel effects to particular scenes.

While I have described my invention it will be understood that the various parts of the invention may be changed without departing from the spirit thereof, and hence I do not limit myself to the present construction set forth, but consider myself at liberty to make changes within the scope of the invention.

I claim:

An optical device for shielding the vision of one eye of an observer of a distant scene while the other eye directly observes such scene, comprising a casing including an opaque shield at one end in line with the line of vision, an eye piece at the other end, an electric light bulb in line with said eye piece, control means for varying the intensity of light of said bulb, aperture means interposed between said light bulb and said eye piece, whereby the observer observes an illuminated spot of light, and means associated with said aperture for varying its size.

DAVID GORDON.